United States Patent
Hasegawa

(10) Patent No.: US 8,946,325 B2
(45) Date of Patent: Feb. 3, 2015

(54) TIRE MEMBER AND METHOD FOR MANUFACTURING THE SAME

(71) Applicant: Toyo Tire & Rubber Co., Ltd., Osaka-shi, Osaka (JP)

(72) Inventor: Shinya Hasegawa, Osaka (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 0 days.

(21) Appl. No.: 14/060,245

(22) Filed: Oct. 22, 2013

(65) Prior Publication Data

US 2014/0128525 A1  May 8, 2014

(30) Foreign Application Priority Data

Nov. 7, 2012  (JP) ................................. 2012-245623

(51) Int. Cl.
*C08K 5/42* (2006.01)
*C08K 13/02* (2006.01)

(52) U.S. Cl.
CPC ...................................... *C08K 13/02* (2013.01)
USPC .......................................... 524/159; 524/157

(58) Field of Classification Search
USPC ......................................................... 524/159
See application file for complete search history.

(56) References Cited

U.S. PATENT DOCUMENTS

2012/0101219 A1* 4/2012 Ozturk et al. ............... 524/575.5
2012/0305159 A1* 12/2012 Sakamoto et al. ............ 152/541

FOREIGN PATENT DOCUMENTS

| JP | 2003-146828 A | 5/2003 |
| JP | 2011-202138 A | 10/2011 |
| JP | 2012-107232 A | 6/2012 |

* cited by examiner

*Primary Examiner* — Hui Chin
(74) *Attorney, Agent, or Firm* — Westerman, Hattori, Daniels & Adrian, LLP

(57) ABSTRACT

A method for manufacturing a tire member, containing a step (A) for producing a mixture containing a diene rubber component, an inorganic filler, a peptizer and a thiosulfuric acid compound containing an amino group, and a step (B) for mixing the mixture, a sulfur component and a vulcanization accelerator, wherein a tire member having improved abrasion resistance, tear strength and flex fatigue resistance is obtained, and the tire member are provided. A premix containing 100 parts by mass of the diene rubber component, from 0.1 to 0.5 parts by mass of the peptizer and 0.2 parts by mass or more of the thiosulfuric acid compound containing an amino group, obtained under a condition in which a temperature during mixing is maintained within a range of from 145 to 170° C. for 20 seconds or more and a temperature at completion of the mixing is 170° C. or lower.

9 Claims, No Drawings

TIRE MEMBER AND METHOD FOR MANUFACTURING THE SAME

BACKGROUND OF THE INVENTION

1. Field of the Invention

The present invention relates to a method for manufacturing a tire member, including a step of adding a thiosulfuric acid compound containing an amino group to a rubber composition, and a tire member obtained by the manufacturing method.

2. Background Art

In a tire member constituting a tire, for example, improvement in abrasion resistance, tear strength and the like are required in a tread part and improvement in tear strength, flex fatigue resistance and the like are required in a sidewall part.

It is known that a thiosulfuric acid compound containing an amino group, such as an S-(2-aminoethyl)thiosulfuric acid compound, can be used as an antioxidant for cosmetics, plastics, recording materials and the like (Patent Document 1). In recent years, the thiosulfuric acid compound is investigated to use in tire applications, and it is proposed to use the compound for the purpose of improving viscoelastic characteristics and the like of a vulcanized rubber (for example, Patent Documents 2 and 3).

However, even though the thiosulfuric compound is used, the expected effect is not achieved in many cases, depending on its use method. Furthermore, it is not yet disclosed to improve abrasion resistance, tear strength, flex fatigue resistance and the like of a rubber by using the thiosulfuric acid compound.

In the manufacturing of rubber goods for a tire, a peptizer is conventionally used for acceleration of mastication in some cases. However, special finding is not indicated up to the present regarding combination use of a thiosulfuric acid compound containing an amino group and a peptizer. Patent Document 2 refers to the use of a peptizer, but does not describe specific use method and efficacy.

Patent Document 1: JP-A-2011-202138
Patent Document 2: JP-A-2003-146828
Patent Document 3: JP-A-2012-107232

SUMMARY OF THE INVENTION

The present invention has been made in view of the above circumstances, and has an object to provide a method for manufacturing a tire member including a step of adding the thiosulfuric acid compound containing an amino group, wherein a peptizer is used to obtain a tire member having further improved abrasion resistance, tear strength and flex fatigue resistance, and a tire member obtained by the manufacturing method.

The method for manufacturing a tire member according to the present invention is a method for manufacturing a tire member, containing a step (A) for producing a mixture containing at least a diene rubber component, an inorganic filler, a peptizer and a thiosulfuric acid compound containing an amino group, and a step (B) for mixing the mixture, a sulfur component and a vulcanization accelerator, wherein, in order to solve the above-mentioned problem, a premix containing 100 parts by mass of the diene rubber component, from 0.1 to 0.5 parts by mass of the peptizer and 0.2 parts by mass or more of the thiosulfuric acid compound containing an amino group, obtained under a condition in which a temperature during mixing is maintained within a range of from 145 to 170° C. for 20 seconds or more and a temperature at completion of the mixing is 170° C. or lower is used in a proportion such that the proportion of the diene rubber component derived from the premix is 40% by mass or more in the entire diene rubber components of the mixture produced in the step (A).

The premix can further contain an inorganic filler in an amount of from 10 to 35 parts by mass per 100 parts by mass of the diene rubber component in the premix.

The premix is preferably obtained under a condition the temperature during mixing is maintained at a temperature in a range of x±5° C. (x=150 to 165° C.) for 20 seconds or more.

The thiosulfuric acid compound containing an amino group can be at least one selected from the group consisting of thiosulfuric acid compounds represented by any one of the following formulae (1) to (3) and their salts.

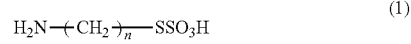

wherein n is an integer of from 2 to 9.

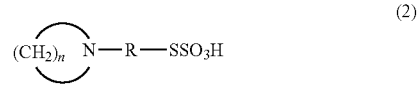

wherein R represents an alkanediyl group having from 3 to 12 carbon atoms, and n is an integer of from 2 to 5.

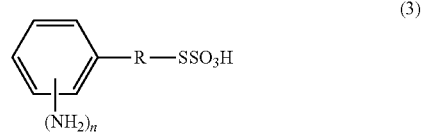

wherein R represents an alkanediyl group having from 1 to 6 carbon atoms, and n is an integer of from 1 to 2.

The tire member according to the present invention is obtained by the above-described manufacturing method of the present invention.

The tire according to the present invention contains the tire member of the present invention.

According to the present invention, a premix containing the predetermined proportions of the diene rubber component, the peptizer, and the thiosulfuric acid compound containing an amino group and which is obtained by mixing them under predetermined conditions is used in a predetermined amount, thereby a tire member having further improved abrasion resistance, tear strength and flex fatigue resistance is obtained. The improvement in those physical properties is considered to be due to that generation of radicals is accelerated by the mixing of the thiosulfuric acid compound containing an amino group and the peptizer, and reactivity to the diene rubber is improved.

DETAILED DESCRIPTION OF THE INVENTION

The embodiment for carrying out the present invention is described in detail below.

The method for manufacturing a tire member according to the present invention contains using a predetermined amount of a premix containing at least a diene rubber component, a peptizer, and a thiosulfuric acid compound containing an amino group in predetermined proportions, further containing an inorganic filler as necessary, and which is obtained by controlling a temperature during mixing. The premix is mixed with a diene rubber component, a thiosulfuric acid compound containing an amino group and an inorganic filler, that are further added as necessary, and other compounding ingredients and additives, in the step (A). In the present specification, the further addition of the diene rubber component, the thiosulfuric acid compound containing an amino group and the inorganic filler to the premix in the step (A) is called "post-addition". The components contained in the premix and the components of the post-addition may be the same kinds and may be different kinds.

Examples of the diene rubber component (hereinafter sometimes simply referred to as a "rubber component") that can be used in the present invention include various natural rubbers (NR), various polybutadiene rubbers (BR), and various styrene-butadiene rubbers (SBR). Those may be used in one kind and may be used as a mixture of two or more kinds. The natural rubber is preferably used in an amount of 40 parts by mass or more per 100 parts by mass of the entire diene rubber components in order to maintain mechanical strength characteristics. As necessary, modified diene rubbers having an amino group, an alkoxysilane group, a hydroxy group, en epoxy group, a carboxy group, a cyano group, a halogen and the like introduced therein can be used as those rubbers. Additionally, for example, a butadiene rubber containing a syndiotactic crystal (for example, VCR412, manufactured by Ube Industries, Ltd.) can be used.

Examples of the inorganic filler include carbon black, silica, talc, clay, aluminum hydroxide and titanium oxide that are generally used in a rubber field. In general, carbon black or silica is preferably used.

The amount of the inorganic filler added is not particularly limited, and is appropriately adjusted depending on, for example, the purpose of use of a tire member. When only carbon black is used, the amount of carbon black is preferably a range of from 30 to 80 parts by mass per 100 parts by mass of the entire rubber component. When silica is added, the amount of silica is preferably a range of from 10 to 120 parts by mass per 100 parts by mass of the rubber component. Furthermore, when silica is added, carbon black is preferably added in an amount of from 5 to 50 parts by mass per 100 parts by mass of the rubber component. Addition ratio of silica/carbon black is particularly preferably from 0.7/1 to 1/0.1.

When silica is used as the filler, a silane coupling agent is preferably concurrently used. The kind of the silane coupling agent is not particularly limited, and silane coupling agents generally used in a rubber composition for a tire can be used. Examples of the silane coupling agent used include sulfide silane and mercaptosilane. The content of the silane coupling agent is preferably from 5 to 15% by mass based on silica.

The peptizer used in the present invention is called a mastication accelerator, and is an agent capable of chemically cutting a natural rubber molecule in an organic solvent. Materials conventionally used can be used as the peptizer without particular limitation. Examples of the peptizer used include disulfides such as o,o-dibenzamide diphenyl disulfide, zinc 2-benzamide thiophenolate, 2-thionaphthol, thioxylenol and pentachlorothiophenol, and mercaptons. Materials containing those and a metal catalyst added thereto can be used. Furthermore, thiazoles such as 2-mercaptobenzothiazole, diacyl peroxides such as benzoyl peroxide, dialkyl peroxides such as dicumyl peroxide, and other organic peroxides can be used. Examples of other peptizers that can be used include xylenethiol, pentachlorothiphenol, zinc pentachlorothiophenolate, 4-tert-butyl-o-thiocresol, zinc salt of 4-tert-butyl-o-thiocresol, mixed dixylyl-disulfide, zinc thiobenzoate, dibenzamide thiophenyl disulfide, a mixture of dibenzamide thiophenyl disulfide and stearic acid, alkylated phenol-sulfide, an aromatic sulfur compound, an organic complex compound, dinitoroso-resorcinol and high molecular weight oil-soluble sulfonic acid. The example further includes piperidine pentamethylene dithiocarbamate, and a mixture of dibenzamide diphenyl disulfide and stearic acid. Cyclohexylamine salt of 2-mercaptobenzotiazole, N-cyclohexyl-2-benzothiazolyl suflenamide and N-phenyl-N'-isopropyl-p-phenylenediamine that are known as a vulcanization accelerator can be used.

Compounds containing the above-described peptizers having a reactive functional group such as hydroxy group or carboxy group contained in the molecule thereof can be used as special peptizers (hereinafter referred to as "functional group-introduced peptizer"). Those may be used alone or as mixtures with the above-described general peptizers in an optional mixing ratio. Reactive functional group can be introduced in a molecular chain of natural rubber by peptizing natural rubber using the functional group-introduced peptizer.

Of the functional group-introduced peptizers, examples of the peptizer containing a hydroxy group include 2-hydroxydiphenyl disulfide, 2-hydroxyethyl disulfide, mercaptophenol, 2-mercaptoethanol and 3-mercapto-1,2-propanediol. Examples of the peptizer containing a carboxy group include mercaptobenzoic acid, mercaptoacetic acid and mercaptopropionic acid. Carboxylic anhydride such as maleic anhydride can be used as the functional group-introduced peptizer. Acid anhydride group can be introduced in a molecular chain of natural rubber by concurrently using maleic anhydride or the like and the peptizer in an arbitrary mixing ratio.

The addition amount of the peptizer in the premix used in the present invention is preferably from 0.1 to 0.5 parts by mass, and more preferably from 0.1 to 0.3 parts by mass, per 100 parts by mass of the diene rubber in the premix. Where the amount of the peptizer added is less than 0.1 parts by mass, the intended effect in the present invention is difficult to be achieved. Where the amount exceeds 0.5 parts by mass, vulcanization inhibition may occur. Those peptizers can be used in one kind alone, and can be used as a combination of two kinds or more.

The thiosulfuric acid compound containing an amino group used in the present invention is preferably a thiosulfuric acid compound represented by any one of the above formulae (1) to (3) or its salt. At least one kind thereof can be used. Examples of the salt include an alkali metal salt such as lithium salt, sodium salt, potassium salt or cesium salt; a transition metal salt such as cobalt salt or copper salt; a typical metal salt such as zinc salt; and a substituted or unsubstituted ammonium salt such as ammonium salt or trimethylammonium salt. Of those, metal salts of lithium, sodium, potassium, cesium, cobalt, copper and zinc are preferred, and above all, lithium salt, sodium salt and potassium salt are preferred. When the thiosulfuric acid compound and its salt are used as a mixture in the present invention, a mixture obtained by, for example, a method of mixing the thiosulfuric acid compound and its salt, a method of forming a part of the thiosulfuric acid compound into a metal salt using a metal alkali, or a method of neutralizing a part of a metal salt of the thiosulfuric acid using proton acid can be used. The term "at least one of the thiosulfuric acid compounds represented by any one of the formulae (1) to (3) and their salts" is hereinafter sometimes referred to as "thiosulfuric acid compound and/or its salt".

Preferred examples of the compound represented by the formula (1) include S-(3-aminopropyl)thiosulfuric acid, S-(3-aminobutyl)thiosulfuric acid, S-(3-aminopentyl)thiosulfuric acid and S-(3-aminohexyl)thiosulfuric acid.

The compound represented by the formula (1) can be produced by any conventional method. A salt of S-(3-aminopropyl)thiosulfuric acid can be produced by, for example, a method of reacting 3-halopropylamine and sodium thiosulfate, or a method of reacting phthalimide potassium salt and 1,3-dihalopropane, reacting the compound thus obtained and sodium thiosulfate, and then hydrolyzing the compound thus obtained. S-(3-aminopropyl)thiosulfuric acid can be produced by neutralizing a salt of S-(3-aminopropyl)thiosulfuric acid with proton acid. S-(3-aminopropyl)thiosulfuric acid and/or its salt thus produced can be isolated by an operation such as concentration or crystallization, and the S-(3-aminopropyl)thiosulfuric acid and/or its salt isolated generally contain from about 0.1 to 5% of water.

Examples of the compound represented by the formula (2) include S-3-(piperidin-1-yl)propylthiosulfuric acid, S-4-(piperidin-1-yl)butylthiosulfuric acid, S-5-(piperidin-1-yl)pentylthiosulfuric acid, S-6-(piperidin-1-yl)hexylthiosulfuric acid, S-7-(piperidin-1-yl)heptylthiosulfuric acid, S-8-(piperidin-1-yl)octylthiosulfuric acid, S-10-(piperidin-1-yl)decylthiosulfuric acid, S-12-(piperidin-1-yl)dodecylthiosulfuric acid, S-3-(pyrrolidin-1-yl)propylthiosulfuric acid, S-4-(pyrrolidin-1-yl)butylthiosulfuric acid, S-5-(pyrrolidin-1-yl)pentylthiosulfuric acid, S-6-(pyrrolidin-1-yl)hexylthiosulfuric acid, S-7-(pyrrolidin-1-yl)heptylthiosulfuric acid, S-8-(pyrrolidin-1-yl)octylthiosulfuric acid, S-10-(pyrrolidin-1-yl)decylthiosulfuric acid, and S-12-(pyrrolidin-1-yl)dodecylthiosulfuric acid. Of those, S-3-(piperidin-1-yl)propylthiosulfuric acid, sodium S-3-(piperidin-1-yl)propylthiosulfate, S-6-(piperidin-1-yl)hexylthiosulfuric acid or sodium S-6-(piperidin-1-yl)hexylthiosulfate is preferred, and sodium S-3-(piperidin-1-yl)propylthiosulfate is particularly preferred.

The compound represented by the formula (2) can be produced by, for example, the following reaction formula.

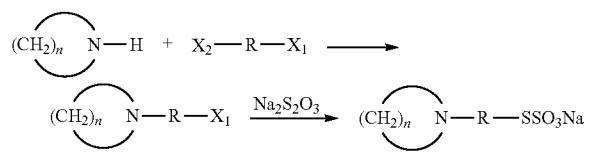

wherein R and n are the same as defined in the formula (2), and $X_1$ and $X_2$ each independently represent chlorine atom, bromine atom or iodine atom.

According to the production method, a sodium salt is generally obtained, but a desired compound can be produced by conducting cation exchange as necessary. The compound obtained generally contains from about 0.1 to 5% by mass of water.

Examples of the compound represented by the formula (3) include S-(4-aminophenyl)methylthiosulfuric acid, S-[2-(4-aminophenyl)ethyl]thiosulfuric acid, S-[3-(4-aminophenyl)propyl]thiosulfuric acid, S-[4-(4-aminophenyl)butyl]thiosulfuric acid, S-[5-(4-aminophenyl)pentyl]thiosulfuric acid, S-[6-(4-aminophenyl)hexyl]thiosulfuric acid, S-[2-(3-aminophenyl)methyl]thiosulfuric acid, S-[2-(3-aminophenyl)ethyl]thiosulfuric acid, S-[3-(3-aminophenyl)propyl]thiosulfuric acid, S-[4-(3-aminophenyl)butyl]thiosulfuric acid, S-[5-(3-aminophenyl)pentyl]thiosulfuric acid, S-[6-(3-aminophenyl)hexyl]thiosulfuric acid, S-(2-aminophenyl)methylthiosulfuric acid, S-[2-(2-aminophenyl)ethyl]thiosulfuric acid, S-[3-(2-aminophenyl)propyl]thiosulfuric acid, S-[4-(2-aminophenyl)butyl]thiosulfuric acid, S-[5-(2-aminophenyl)pentyl]thiosulfuric acid, S-[6-(2-aminophenyl)hexyl]thiosulfuric acid, S-(3,5-diaminophenyl)methylthiosulfuric acid, S-(3,4-diaminophenyl)methylthiosulfuric acid, S-[2-(3,5-diaminophenyl)ethyl]thiosulfuric acid, and S-[2-(3,4-diaminophenyl)ethyl]thiosulfuric acid. Of those, S-[2-(4-aminophenyl)ethyl]thiosulfuric acid and sodium S-[2-(4-aminophenyl)ethyl]thiosulfate are preferred, and sodium S-[2-(4-aminophenyl)ethyl]thiosulfate is particularly preferred.

The compound represented by the formula (3) can be produced by, for example, the following reaction formula.

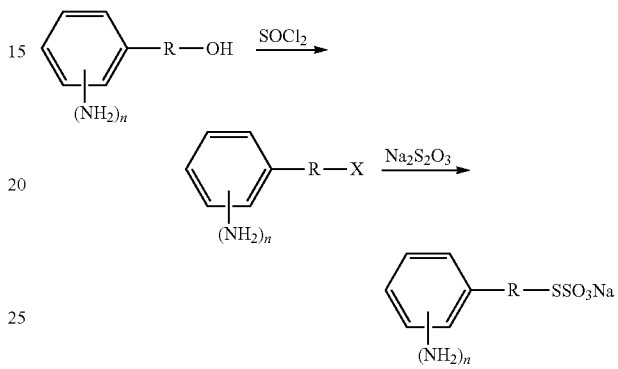

wherein R and n are the same as defined in the formula (3), and X represents chlorine atom, bromine atom or iodine atom.

According to the production method, a sodium salt is generally obtained, but a desired compound can be produced by conducting cation exchange as necessary. The compound obtained generally contains from about 0.1 to 5% by mass of water.

The amount of the thiosulfuric acid compound and/or its salt added in the step (A) of the manufacturing method of the present invention is preferably 0.2 parts by mass or more (that is, 0.2 phr or more), and more preferably from 0.2 to 2.0 parts by mass, per 100 parts by mass of the diene rubber component in the premix. Where the amount is less than 0.2 parts by mass, desired improvement in properties may not be achieved.

The premix is used in the present invention in such an amount that the proportion of the diene rubber component derived from the premix is 40 mass % or more in the entire diene rubber component of the mixture produced in the step (A). Where the amount of the premix used is smaller than this, the intended effect of the present invention may not be achieved.

The production of the premix can be conducted using the conventional mixing apparatus equipped with at least a stirring rotor, a jacket through which a heating/cooling medium flows, and a pressure ram, such as Banbury mixer. The heating/cooling medium is heated as necessary so as to reach a desired temperature, flows in the jacket, and heats or cools the mixture by heat transfer of a wall surface of a mixing vessel. Water is generally used as the heating/cooling medium. The pressure ram moves up and down in a cylinder and adjusts a pressure in the mixing apparatus. The mixing apparatus is preferably further equipped with a temperature sensor detecting a temperature of a mixture in the equipment, and a control part controlling the number of revolution of a rotor.

The mixing generally involves generation of heat. Therefore, if any control is not conducted, a temperature of a mixture during mixing is rapidly increased. In the manufacturing method of the present invention, mixing conditions and the like are adjusted such that the temperature of the premix is maintained in a range of from 145 to 170° C. for 20 seconds or more, and the premix is discharged at 170° C. or lower. Specific means of temperature control is not particularly limited. For example, the temperature can be maintained in the above range by controlling at least one of the rotation speed of the rotor of the mixing apparatus, the temperature of the heating/cooling medium, and the ram pressure. Temperature control of the mixture becomes more easy and secure by automatically controlling the rotation speed, and the like by PID (Proportional/Integral/Differential) control.

Where the time that the temperature of the premix during mixing is maintained in the above temperature range is less than 20 seconds, the desired properties are difficult to be obtained. Where the temperature at the completion of the mixing exceeds 170° C., physical properties may be decreased by deterioration of a rubber.

The case that the time maintained in the above temperature range is less than 20 seconds simulates, for example, a case that temperature increase is mild and a temperature when discharging is lower than 145° C., a case that even though reached 145° C., the time from this to the discharge is less than 20 seconds, or a case that a temperature is rapidly increased and the mixture passes the temperature range within 20 seconds.

The upper limit of the time maintained in the above temperature range is preferably 120 seconds or less, and more preferably 60 seconds or less. The mixing at high temperature for a long period of time causes the decrease in a molecular weight of a rubber and gelation, and this may lead to the decrease in abrasion resistance and fatigue resistance. Furthermore, the mixing leads to deterioration of productivity by the increase in mixing time, and the increase in cost of energy used in the mixing. Therefore, the cost effectiveness is decreased.

Preferably, the control of the rotation speed of the rotor, and the like is severely conducted to maintain the temperature of the mixture in a range of x±5° C. (x=150 to 165° C.) for 20 seconds or more. That is, when a temperature fallen within a range of from 150 to 165° C. is defined as reference temperature x, the temperature is controlled such that the minimum temperature is $(x-5)°$ C. or higher and the maximum temperature is $(x+5)°$ C. or lower, such as a range of from 145 to 155° C. or a range of from 160 to 170° C. Thus, when the mixture is maintained for a certain period of time while keeping the decreased temperature variation, the action by the thiosulfuric acid compound and/or its salt is further increased, and the improvement effect of each property becomes more remarkable. Particularly preferably, the mixture is maintained at a temperature in a range of 160° C.±5° C., that is, a range of from 155 to 165° C., for a period of from 20 to 120 seconds.

The step (A) for mixing the premix obtained as above with the diene rubber component, the thiosulfuric acid compound containing an amino group and the inorganic filler, that are further added as necessary, other compounding ingredients and additives is described below. As the other compounding ingredients and additives, materials generally used in the production of a tire rubber member, such as zinc oxide, stearic acid, an age resister and oil, can be used without particular limitation. The amount of those added is not limited, and is appropriately adjusted depending on, for example, purpose of use of a tire member. In general, the amount of zinc oxide used is preferably a range of from 1 to 15 parts by mass, and more preferably a range of from 3 to 8 parts by mass, per 100 parts by mass the entire rubber components. The amount of stearic acid used is preferably a range of from 0.5 to 10 parts by mass, and more preferably a range of from 1 to 5 parts by mass, per 100 parts by mass the entire rubber components.

Mixing the premix with the post-added materials, and other compounding ingredients and additives, in the step (A) is an operation generally called kneading, and can be conducted using a mixing apparatus such as Banbury mixer according to the conventional method.

The temperature of the mixture throughout the whole step (A) is preferably a range of from 145 to 170° C. Where the temperature of the mixture is lower than 145° C., the mixing may become insufficient. Where the temperature of the mixture exceeds 170° C., physical properties may be deteriorated due to deterioration of a rubber. The overall mixing time in the step (A) is not particularly limited, and is generally from about 1 to 10 minutes.

The step (B) of the present invention for mixing the mixture obtained in the step (A), a sulfur component and a vulcanization accelerator is described below.

Examples of the sulfur component used include powdered sulfur, precipitated sulfur, colloidal sulfur, insoluble sulfur and high dispersion sulfur. In general, powdered sulfur is preferred, and in the case of using in a tire member containing a large amount of sulfur, such as a member for a belt, insoluble sulfur is preferred. The sulfur component used herein does not include the thiosulfuric acid compounds represented by any one of the formulae (1) to (3) and their salts. The amount of the sulfur component used is preferably a range of from 0.3 to 5 parts by mass, and more preferably a range of from 0.5 to 3 parts by mass, per 100 parts by mass of the entire rubber components.

The vulcanization accelerator is not particularly limited, and examples thereof include a thiazole vulcanization accelerator, a sulfenamide vulcanization accelerator, and a guanidine vulcanization accelerator.

The ratio between the sulfur component and the vulcanization accelerator is not particularly limited, but is preferably a range of sulfur component/vulcanization accelerator=2/1 to 1/2 in mass ratio. A so-called EV vulcanization in which the ratio of sulfur/vulcanization accelerator is 1 or less, which is a method for improving heat resistance of a rubber component mainly containing natural rubber, is preferably used also in the present invention in uses in which the improvement of heat resistance is particularly required.

The operation of the step (B) for mixing of the mixture obtained in the step (A), the sulfur component and the vulcanization accelerator in the step (B) is also generally called kneading, and can be conducted according to the conventional methods using a mixing apparatus such as an open roll or Banbury mixer.

The kneading time in the step (B) is preferably from 1 to 10 minutes, and more preferably from 2 to 8 minutes. When the kneading time is 1 minute or more, dispersibility of the sulfur component and the vulcanization accelerator in the rubber component tends to be increased, and when the kneading time is 10 minutes or less, deterioration of the rubber component tends to be suppressed. Those are preferred in that viscoelasticity characteristic of the vulcanized rubber finally obtained is improved.

The mixture obtained as above is subjected to a heat treatment generally called vulcanization. The heat treatment is conducted under ordinary pressures or under pressure, and the treatment temperature is generally from about 120 to 180° C.

The tire member of the present invention obtained as above has improved abrasion resistance, tear strength, fatigue resistance and the like in good balance, and therefore can be preferably used as a tread member such as a base tread or a cap tread, of various tires, and a sidewall member.

Specifically, a tire member is obtained by extrusion molding the mixture into a predetermined cross-sectional shape corresponding to the intended tire member such as a tread member or a sidewall member, or forming a ribbon-like rubber strip from the mixture and spirally winding the strip on a drum, thereby forming the strip into a cross-sectional shape corresponding to the intended tire member. The tire member is subjected to vulcanization molding according to the conventional method together with other tire member constituting a tire, such as an inner liner, a carcass, a belt, a bead core or a bead filler, whereby the tire of the invention can be obtained.

EXAMPLE

Working examples of the present invention are described below, but the present invention is not limited to those examples. Unless otherwise indicated, addition proportion described hereinafter is mass basis (parts by mass, % by mass and the like). Production method of sodium salt of S-(3-aminopropyl)thiosulfuric acid used in the following examples and comparative examples is as follows.

Production of sodium S-(3-aminopropyl)thiosulfate

A reaction vessel was purged with nitrogen. 25 g (0.11 mol) of 3-bromopropylamine bromate, 28.42 g (0.11 mol) of sodium thiosulfate pentahydrate, 125 ml of methanol and 125 ml of water were charged in the reaction vessel, and the mixture thus obtained was refluxed at 70° C. for 4.5 hours.

The resulting reaction mixture was allowed to cool, and methanol was removed under reduced pressure. 4.56 g of sodium hydroxide was added to the methanol-removed reaction mixture, and the resulting mixture was stirred at room temperature for 30 minutes. Thereafter, sodium bromide as a by-product was removed by hot filtration. The filtrate was concentrated under reduced pressure until precipitating crystals, and then allowed to stand. The crystals were filtered off and washed with ethanol and hexane. The crystals thus obtained were vacuum dried to obtain sodium S-(3-aminopropyl)thiosulfate.

Production of Premix

Natural rubber, carbon black, a peptizer and an amino group-containing thiosulfuric acid compound were mixed in the proportions shown in Tables 1 to 3 below under the conditions shown in each table to obtain premixes. The mixing temperature was controlled by controlling the number of revolution of a rotor of a mixing machine. For example, in the case of a premix X1, the controlled temperature is 150° C. Therefore, the control was started from 145° C. (150° C.-5° C.), and the temperature was controlled so as to be maintained in a temperature range of from 145 to 155° C. (150° C.±5° C.) for 25 seconds. In the case that PID control is "Done" as in premix X6, the temperature was controlled by PID control. The details of components of the premix are as follows.

Natural rubber: RSS#3

Carbon black 1: SEAST 6, manufactured by Tokai Carbon Co., Ltd.

Carbon black 2: SEAST KH, manufactured by Tokai Carbon Co., Ltd.

Carbon black 3: SEAST 3, manufactured by Tokai Carbon Co., Ltd.

Peptizer 1: NOCTIZER SS (o,o-dibenzamidodiphenyldisulfide), manufactured by Ouchi Shinko Chemical Industrial Co., Ltd.

Peptizer 2: STRUKTOL A82 (composite article of a metal compound using an organic material and an inorganic material as carriers), manufactured by Struktol Peptizer 3: AKTIPLAST 6 (mixed diallyl-disulfide), manufactured by Rhein Chemie Amino group-containing thiosulfuric acid compound 1: Sodium S-(3-aminopropyl)thiosulfate Amino group-containing thiosulfuric acid compound 2: S-(3-aminoethyl) thiosulfuric acid, manufactured by Wako Pure Chemical Industries, Ltd.

TABLE 1

| | Premix | | | | | | | | | | | | |
|---|---|---|---|---|---|---|---|---|---|---|---|---|---|
| | X1 | X2 | X3 | X4 | X5 | X6 | X7 | X8 | X9 | X10 | X11 | X12 | X13 |
| Natural rubber | 100 | 100 | 100 | 100 | 100 | 100 | 100 | 100 | 100 | 100 | 100 | 100 | 100 |
| Carbon black 1 | | 30 | 15 | | | | | 30 | | 30 | | | |
| Peptizer 1 | 0.3 | 0.3 | 0.3 | 0.3 | 0.3 | 0.3 | | | 0.3 | 0.3 | 0.3 | 0.3 | 0.3 |
| Amino group-containing thiosulfuric acid compound 1 | 1 | 1 | 1 | 1 | 1 | 1 | 1 | 1 | | | 1 | 1 | 1 |
| Discharge temperature (° C.) | 152 | 162 | 158 | 151 | 152 | 160 | 152 | 162 | 152 | 162 | 181 | 151 | 165 |
| Control temperature (° C.) | 150 | 160 | 155 | 150 | 150 | 160 | 150 | 160 | 150 | 160 | 180 | 150 | None |
| Mixing time at control temperature ± 5° C. (sec) | 25 | 30 | 50 | 55 | 110 | 55 | 25 | 30 | 25 | 30 | 30 | 10 | None |
| Mixing time at 145 to 170° C. (sec) | 30 | 36 | 60 | 60 | 115 | 65 | 31 | 35 | 30 | 36 | 50 | 10 | 15 |
| PID control | None | None | None | None | None | Done | None | None | None | None | None | None | None |

TABLE 2

| | Premix | | | | | | | | | | | | |
|---|---|---|---|---|---|---|---|---|---|---|---|---|---|
| | Y1 | Y2 | Y3 | Y4 | Y5 | Y6 | Y7 | Y8 | Y9 | Y10 | Y11 | Y12 | Y13 |
| Natural rubber | 100 | 100 | 100 | 100 | 100 | 100 | 100 | 100 | 100 | 100 | 100 | 100 | 100 |
| Carbon black 2 | | 20 | 10 | | | | | 20 | | 20 | | | |
| Peptizer 2 | 0.3 | 0.3 | 0.3 | 0.3 | 0.3 | 0.3 | | | 0.3 | 0.3 | 0.3 | 0.3 | 0.3 |
| Amino group-containing thiosulfuric acid compound 2 | 1 | 1 | 1 | 1 | 1 | 1 | 1 | 1 | | | 1 | 1 | 1 |

TABLE 2-continued

|  | Premix | | | | | | | | | | | | |
| --- | --- | --- | --- | --- | --- | --- | --- | --- | --- | --- | --- | --- | --- |
|  | Y1 | Y2 | Y3 | Y4 | Y5 | Y6 | Y7 | Y8 | Y9 | Y10 | Y11 | Y12 | Y13 |
| Discharge temperature (° C.) | 151 | 161 | 156 | 152 | 152 | 160 | 152 | 162 | 151 | 161 | 181 | 151 | 165 |
| Control temperature (° C.) | 150 | 160 | 155 | 150 | 150 | 160 | 150 | 160 | 150 | 160 | 180 | 150 | None |
| Mixing time at control temperature ± 5° C. (sec) | 25 | 30 | 50 | 55 | 110 | 45 | 25 | 30 | 25 | 30 | 30 | 10 | None |
| Mixing time at 145 to 170° C. (sec) | 28 | 37 | 61 | 61 | 115 | 63 | 29 | 36 | 29 | 35 | 52 | 10 | 10 |
| PID control | None | None | None | None | None | Done | None | None | None | None | None | None | None |

TABLE 3

|  | Premix | | | | | | | | | | | | |
| --- | --- | --- | --- | --- | --- | --- | --- | --- | --- | --- | --- | --- | --- |
|  | Z1 | Z2 | Z3 | Z4 | Z5 | Z6 | Z7 | Z8 | Z9 | Z10 | Z11 | Z12 | Z13 |
| Natural rubber | 100 | 100 | 100 | 100 | 100 | 100 | 100 | 100 | 100 | 100 | 100 | 100 | 100 |
| Carbon black 3 |  | 30 | 15 |  |  |  |  | 30 |  | 30 |  |  |  |
| Peptizer 3 | 0.3 | 0.3 | 0.3 | 0.3 | 0.3 | 0.3 |  |  | 0.3 | 0.3 | 0.3 | 0.3 | 0.3 |
| Amino group-containing thiosulfuric acid compound 1 | 1 | 1 | 1 | 1 | 1 | 1 | 1 | 1 |  |  | 1 | 1 | 1 |
| Discharge temperature (° C.) | 152 | 161 | 157 | 152 | 152 | 160 | 152 | 162 | 152 | 162 | 181 | 151 | 165 |
| Control temperature (° C.) | 150 | 160 | 155 | 150 | 150 | 160 | 150 | 160 | 150 | 160 | 180 | 150 | None |
| Mixing time at control temperature ± 5° C. (sec) | 25 | 30 | 50 | 55 | 110 | 50 | 25 | 30 | 25 | 30 | 30 | 10 | None |
| Mixing time at 145 to 170° C. (sec) | 29 | 35 | 59 | 61 | 116 | 64 | 28 | 36 | 31 | 35 | 51 | 10 | 13 |
| PID control | None | None | None | None | None | Done | None | None | None | None | None | None | None |

Production of Tire Member for Cap Tread

According to the formulations shown in Table 4 below, the above premix and components to be mixed in the step (A) were introduced in Banbury mixer and mixed so as to discharge at 160° C. After adding and mixing a vulcanization accelerator and sulfur of the step (B), the resulting mixture was heated at 150° C. for 30 minutes to conduct vulcanization. Thus, a tire member for a cap tread was obtained. Abrasion resistance, tear strength and flex fatigue resistance of the tire member obtained were evaluated by the following methods. The results obtained are shown in Table 4 below.

Production of Tire Member for Base Tread

According to the formulations shown in Table 5 below, the above premix and components to be mixed in the step (A) were introduced in Banbury mixer and mixed so as to discharge at 160° C. After adding and mixing a vulcanization accelerator and sulfur of the step (B), the resulting mixture was heated at 150° C. for 30 minutes to conduct vulcanization. Thus, a tire member for a base tread was obtained. Abrasion resistance, tear strength and flex fatigue resistance of the tire member obtained were evaluated by the following methods. The results obtained are shown in Table 5 below.

Production of Tire Member for Sidewall

According to the formulations shown in Table 6 below, the above premix and components to be mixed in the step (A) were introduced in Banbury mixer and mixed so as to discharge at 160° C. After adding and mixing a vulcanization accelerator and sulfur of the step (B), the resulting mixture was heated at 150° C. for 30 minutes to conduct vulcanization. Thus, a tire member for a side wall was obtained. Abrasion resistance, tear strength and flex fatigue resistance of the tire member obtained were evaluated by the following methods. The results obtained are shown in Table 6 below.

Details of materials added as shown in Tables 4 to 6 are as follows.

Natural rubber: RSS#3
BR 1: BR150L, manufactured by Ube Industries, Ltd.
BR 2: CB22, manufactured by LANXESS.
Carbon black 1: SEAST 6, manufactured by Tokai Carbon Co., Ltd.
Carbon black 2: SEAST KH, manufactured by Tokai Carbon Co., Ltd.
Carbon black 3: SEAST 3, manufactured by Tokai Carbon Co., Ltd.
Silica: NIPSIL AQ, manufactured by Tosoh Silica Corporation
Silane coupling agent: Si69, manufactured by Degussa
Zinc oxide: Zinc flower #1, manufactured by Mitsui Mining & Smelting Co., Ltd.
Stearic acid: Bead stearic acid, manufactured by NOF Corporation
Age resister: ANTIGEN 6C, manufactured by Sumitomo Chemical Co., Ltd.
Sulfur: Powdered sulfur, manufactured by Tsurumi Chemical Industry Co., Ltd.
Vulcanization accelerator: SANCELER CM-G, manufactured by Sanshin Chemical Industry Co., Ltd.
Amino group-containing thiosulfuric acid compound 1: Sodium S-(3-aminopropyl)thiosulfate
Amino group-containing thiosulfuric acid compound 2: S-(3-aminoethyl) thiosulfuric acid, manufactured by Wako Pure Chemical Industries, Ltd.

Abrasion resistance: Measured according to JIS K6264 under the conditions of slip ratio of 30%, applied load of 40N, and amount of sand dropped of 20 g/min. The results obtained are shown by an index in which the value of Comparative Example 1 is 100. The lager value shows greater abrasion resistance.

Tear strength: Measured according to JIS K6252. The results obtained are shown by an index in which the value of Comparative Example 1 is 100. The lager value shows greater tear strength.

Flex fatigue resistance: Flex crack growth test was conducted according to JIS K6260 (De Mattia type flex cracking test). The measurement was conducted under the condition of 23° C., and the number until crack growth reaches 2 mm was obtained. The results obtained are shown by an index in which the value of Comparative Example 1 is 100. The lager value shows greater fatigue resistance.

TABLE 4

| | | Example 1 | Example 2 | Example 3 | Example 4 | Example 5 | Example 6 | Example 7 | Example 8 |
|---|---|---|---|---|---|---|---|---|---|
| Premix | | X1 | X2 | X3 | X4 | X5 | X6 | X2 | X2 |
| Derived from premix | Natural rubber | 70 | 70 | 70 | 70 | 70 | 70 | 70 | 100 |
| | Carbon black 1 | | 21 | 10.5 | | | | 21 | 30 |
| | Peptizer 1 | 0.21 | 0.21 | 0.21 | 0.21 | 0.21 | 0.21 | 0.21 | 0.3 |
| | Thiosulfuric acid compound 1 | 0.7 | 0.7 | 0.7 | 0.7 | 0.7 | 0.7 | 0.7 | 1 |
| Post addition | BR1 | 30 | 30 | | 30 | 30 | 30 | 30 | |
| | BR2 | | | 30 | | | | | |
| | Carbon black 1 | 40 | 19 | 29.5 | 40 | 40 | 40 | 14 | 15 |
| | Thiosulfuric acid compound 1 | | | 0.5 | | | | | |
| Premix + post addition | Total amount of carbon black | 40 | 40 | 40 | 40 | 40 | 40 | 35 | 45 |
| | Total amount of thiosulfuric acid compound | 0.7 | 0.7 | 1.2 | 0.7 | 0.7 | 0.7 | 0.7 | 1 |
| Silica | | | | | | | | 10 | |
| Silane coupling agent | | | | | | | | 1.2 | |
| Zinc oxide | | 3 | 3 | 3 | 3 | 3 | 3 | 3 | 3 |
| Stearic acid | | 1 | 1 | 1 | 1 | 1 | 1 | 1 | 1 |
| Age resister | | 1 | 1 | 1 | 1 | 1 | 1 | 1 | 1 |
| Sulfur | | 2 | 2 | 2 | 2 | 2 | 2 | 2 | 2 |
| Vulcanization accelerator | | 1 | 1 | 1 | 1 | 1 | 1 | 1 | 1 |
| Abrasion resistance | | 107 | 108 | 113 | 110 | 106 | 113 | 108 | 107 |
| Tear strength | | 108 | 108 | 111 | 109 | 105 | 107 | 112 | 111 |
| Flex fatigue resistance | | 112 | 113 | 117 | 117 | 110 | 117 | 112 | 110 |

| | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Premix | | X7 | X8 | X9 | X10 | X11 | X12 | X13 | X8 |
| Derived from premix | Natural rubber | 70 | 70 | 70 | 70 | 70 | 70 | 70 | 70 |
| | Carbon black 1 | | 21 | | 21 | | | | 21 |
| | Peptizer 1 | | | 0.21 | 0.21 | 0.21 | 0.21 | 0.21 | |
| | Thiosulfuric acid compound 1 | 0.7 | 0.7 | | | 0.7 | 0.7 | 0.7 | 0.7 |
| Post addition | BR1 | 30 | 30 | 30 | 30 | 30 | 30 | 30 | 30 |
| | BR2 | | | | | | | | |
| | Carbon black 1 | 40 | 19 | 40 | 19 | 40 | 40 | 40 | 14 |
| | Thiosulfuric acid compound 1 | | | | | | | | |
| Premix + post addition | Total amount of carbon black | 40 | 40 | 40 | 40 | 40 | 40 | 40 | 35 |
| | Total amount of thiosulfuric acid compound | 0.7 | 0.7 | 0 | 0 | 0.7 | 0.7 | 0.7 | 0.7 |
| Silica | | | | | | | | | 10 |
| Silane coupling agent | | | | | | | | | 1.2 |
| Zinc oxide | | 3 | 3 | 3 | 3 | 3 | 3 | 3 | 3 |
| Stearic acid | | 1 | 1 | 1 | 1 | 1 | 1 | 1 | 1 |
| Age resister | | 1 | 1 | 1 | 1 | 1 | 1 | 1 | 1 |
| Sulfur | | 2 | 2 | 2 | 2 | 2 | 2 | 2 | 2 |
| Vulcanization accelerator | | 1 | 1 | 1 | 1 | 1 | 1 | 1 | 1 |
| Abrasion resistance | | 100 | 101 | 96 | 96 | 91 | 102 | 100 | 101 |
| Tear strength | | 100 | 100 | 96 | 97 | 79 | 103 | 99 | 104 |
| Flex fatigue resistance | | 100 | 101 | 97 | 96 | 81 | 106 | 99 | 100 |

TABLE 5

| | | Example 9 | Example 10 | Example 11 | Example 12 | Example 13 | Example 14 | Example 15 |
|---|---|---|---|---|---|---|---|---|
| Premix | | Y1 | Y2 | Y3 | Y4 | Y5 | Y6 | Y1 |
| Derived from premix | Natural rubber | 100 | 100 | 100 | 100 | 100 | 100 | 90 |
| | Carbon black 2 | | 20 | 10 | | | | |
| | Peptizer 2 | 0.3 | 0.3 | 0.3 | 0.3 | 0.3 | 0.3 | 0.27 |
| | Thiosulfuric acid compound 2 | 1 | 1 | 1 | 1 | 1 | 1 | 0.9 |
| Post addition | BR1 | | | | | | | 10 |
| | Carbon black 2 | 20 | | 10 | 20 | 20 | 20 | 20 |
| | Thiosulfuric acid compound 2 | | | 0.5 | | | | |
| Premix + post addition | Total amount of carbon black | 20 | 20 | 20 | 20 | 20 | 20 | 20 |
| | Total amount of thiosulfuric acid compound | 1 | 1 | 1.5 | 1 | 1 | 1 | 0.9 |

TABLE 5-continued

|  |  |  |  |  |  |  |  |
|---|---|---|---|---|---|---|---|
| Silica | 15 | 15 | 15 | 15 | 15 | 15 | 15 |
| Silane coupling agent | 1.5 | 1.5 | 1.5 | 1.5 | 1.5 | 1.5 | 1.5 |
| Zinc oxide | 3 | 3 | 3 | 3 | 3 | 3 | 3 |
| Stearic acid | 1 | 1 | 1 | 1 | 1 | 1 | 1 |
| Age resister | 1 | 1 | 1 | 1 | 1 | 1 | 1 |
| Sulfur | 2 | 2 | 2 | 2 | 2 | 2 | 2 |
| Vulcanization accelerator | 1 | 1 | 1 | 1 | 1 | 1 | 1 |
| Abrasion resistance | 108 | 108 | 112 | 110 | 106 | 109 | 107 |
| Tear strength | 109 | 108 | 111 | 110 | 106 | 110 | 108 |
| Flex fatigue resistance | 112 | 112 | 116 | 115 | 110 | 113 | 111 |

|  |  | Comparative Example 9 | Comparative Example 10 | Comparative Example 11 | Comparative Example 12 | Comparative Example 13 | Comparative Example 14 | Comparative Example 15 |
|---|---|---|---|---|---|---|---|---|
| Premix |  | Y7 | Y8 | Y9 | Y10 | Y11 | Y12 | Y13 |
| Derived from premix | Natural rubber | 100 | 100 | 100 | 100 | 100 | 100 | 100 |
|  | Carbon black 2 |  | 20 |  | 20 |  |  | 20 |
|  | Peptizer 2 |  |  | 0.3 | 0.3 | 0.3 | 0.3 | 0.3 |
|  | Thiosulfuric acid compound 2 | 1 | 1 |  |  | 1 | 1 | 1 |
| Post addition | BR1 |  |  |  |  |  |  |  |
|  | Carbon black 2 | 20 |  | 20 |  | 20 | 20 |  |
|  | Thiosulfuric acid compound 2 |  |  |  |  |  |  |  |
| Premix + post addition | Total amount of carbon black | 20 | 20 | 20 | 20 | 20 | 20 | 20 |
|  | Total amount of thiosulfuric acid compound | 1 | 1 | 0 | 0 | 1 | 1 | 1 |
| Silica |  | 15 | 15 | 15 | 15 | 15 | 15 | 15 |
| Silane coupling agent |  | 1.5 | 1.5 | 1.5 | 1.5 | 1.5 | 1.5 | 1.5 |
| Zinc oxide |  | 3 | 3 | 3 | 3 | 3 | 3 | 3 |
| Stearic acid |  | 1 | 1 | 1 | 1 | 1 | 1 | 1 |
| Age resister |  | 1 | 1 | 1 | 1 | 1 | 1 | 1 |
| Sulfur |  | 2 | 2 | 2 | 2 | 2 | 2 | 2 |
| Vulcanization accelerator |  | 1 | 1 | 1 | 1 | 1 | 1 | 1 |
| Abrasion resistance |  | 100 | 101 | 96 | 96 | 91 | 103 | 99 |
| Tear strength |  | 100 | 99 | 95 | 96 | 80 | 103 | 99 |
| Flex fatigue resistance |  | 100 | 100 | 96 | 95 | 82 | 105 | 100 |

TABLE 6

|  |  | Example 16 | Example 17 | Example 18 | Example 19 | Example 20 | Example 21 | Example 22 |
|---|---|---|---|---|---|---|---|---|
| Premix |  | Z1 | Z2 | Z3 | Z4 | Z5 | Z6 | Z2 |
| Derived from premix | Natural rubber | 50 | 50 | 50 | 50 | 50 | 50 | 50 |
|  | Carbon black 3 |  | 15 | 7.5 |  |  |  | 15 |
|  | Peptizer 3 | 0.15 | 0.15 | 0.15 | 0.15 | 0.15 | 0.15 | 0.15 |
|  | Thiosulfuric acid compound 1 | 0.5 | 0.5 | 0.5 | 0.5 | 0.5 | 0.5 | 0.5 |
| Post addition | BR1 | 50 | 50 |  | 50 | 50 | 50 | 50 |
|  | BR2 |  |  | 50 |  |  |  |  |
|  | Carbon black 3 | 30 | 15 | 22.5 | 30 | 30 | 30 | 15 |
|  | Thiosulfuric acid compound 1 |  |  | 0.5 |  |  |  |  |
| Premix + post addition | Total amount of carbon black | 30 | 30 | 30 | 30 | 30 | 30 | 30 |
|  | Total amount of thiosulfuric acid compound | 0.5 | 0.5 | 1 | 0.5 | 0.5 | 0.5 | 0.5 |
| Silica |  |  |  |  |  |  |  | 5 |
| Silane coupling agent |  |  |  |  |  |  |  | 0.6 |
| Zinc oxide |  | 3 | 3 | 3 | 3 | 3 | 3 | 3 |
| Stearic acid |  | 1 | 1 | 1 | 1 | 1 | 1 | 1 |
| Age resister |  | 1 | 1 | 1 | 1 | 1 | 1 | 1 |
| Sulfur |  | 2 | 2 | 2 | 2 | 2 | 2 | 2 |

TABLE 6-continued

| Vulcanization accelerator | 1 | 1 | 1 | 1 | 1 | 1 | 1 |
|---|---|---|---|---|---|---|---|
| Tear strength | 108 | 109 | 113 | 109 | 106 | 109 | 112 |
| Flex fatigue resistance | 111 | 111 | 117 | 115 | 109 | 116 | 111 |

| | | Comparative Example 16 | Comparative Example 17 | Comparative Example 18 | Comparative Example 19 | Comparative Example 20 | Comparative Example 21 | Comparative Example 22 | Comparative Example 23 |
|---|---|---|---|---|---|---|---|---|---|
| Premix | | Z7 | Z8 | Z9 | Z10 | Z11 | Z12 | Z13 | Z8 |
| Derived from premix | Natural rubber | 50 | 50 | 50 | 50 | 50 | 50 | 50 | 50 |
| | Carbon black 3 | | 15 | | 15 | | | | 15 |
| | Peptizer 3 | | | 0.15 | 0.15 | 0.15 | 0.15 | 0.15 | |
| | Thiosulfuric acid compound 1 | 0.5 | 0.5 | | | 0.5 | 0.5 | 0.5 | 0.5 |
| Post addition | BR1 | 50 | 50 | 50 | 50 | 50 | 50 | 50 | 50 |
| | BR2 | | | | | | | | |
| | Carbon black 3 | 30 | 15 | 30 | 15 | 30 | 30 | 30 | 15 |
| | Thiosulfuric acid compound 1 | | | | | | | | |
| Premix + post addition | Total amount of carbon black | 30 | 30 | 30 | 30 | 30 | 30 | 30 | 30 |
| | Total amount of thiosulfuric acid compound | 0.5 | 0.5 | 0 | 0 | 0.5 | 0.5 | 0.5 | 0.5 |
| Silica | | | | | | | | | 5 |
| Silane coupling agent | | | | | | | | | 0.6 |
| Zinc oxide | | 3 | 3 | 3 | 3 | 3 | 3 | 3 | 3 |
| Stearic acid | | 1 | 1 | 1 | 1 | 1 | 1 | 1 | 1 |
| Age resister | | 1 | 1 | 1 | 1 | 1 | 1 | 1 | 1 |
| Sulfur | | 2 | 2 | 2 | 2 | 2 | 2 | 2 | 2 |
| Vulcanization accelerator | | 1 | 1 | 1 | 1 | 1 | 1 | 1 | 1 |
| Tear strength | | 100 | 99 | 94 | 95 | 79 | 102 | 100 | 102 |
| Flex fatigue resistance | | 100 | 100 | 95 | 96 | 81 | 105 | 99 | 100 |

It is seen from the results shown in Tables 4 to 6 that in the manufacturing method of the examples of the present invention, abrasion resistance, tear strength and flex fatigue resistance are improved by using the premix containing predetermined proportions of the diene compound, the peptizer and the thiosulfuric acid compound containing an amino group, which premix is obtained by controlling the temperature during mixing. On the other hand, in the comparative examples using a premix in which either of the peptizer and the thiosulfuric acid compound containing an amino group was not used and the comparative examples using a premix in which those were used but which was not mixed under the conditions defined in the present invention, the physical properties were poor or the degree of improvement was insufficient.

The tire member obtained by the method for manufacturing a tire member according to the present invention can be used in various tires such as radial tires for passenger cars, and tires for heavy load of tracks, buses and the like.

What is claimed is:

1. A method for manufacturing a tire member, comprising:
   preparing a premix comprising 100 parts by mass of a first diene rubber component, 0.1 to 0.5 parts by mass of a peptizer, and 0.2 parts by mass or more of a first thiosulfuric acid compound containing an amino group,
   preparing a mixture by kneading the premix with a second diene rubber component, an inorganic filler, and a second thiosulfuric acid compound containing an amino group, and
   mixing the mixture with a sulfur component and a vulcanization accelerator,
   wherein the mixture comprises 40% by mass or more of the first diene rubber component relative to a total diene rubber component in the mixture,
   wherein a temperature during mixing of the premix is maintained within a range of from 145 to 170° C. for 20 seconds or more, and a temperature at completion of the mixing is 170° C. or lower,
   wherein the first diene rubber component may be the same as or different from the second diene rubber component, and
   wherein the first thiosulfuric acid compound may be the same as or different from the second thiosulfuric acid compound.

2. The method for manufacturing a tire member according to claim 1,
   wherein the premix further comprises 10 to 35 parts by mass of an inorganic filler per 100 parts by mass of the first diene rubber component in the premix.

3. The method for manufacturing a tire member according to claim 1,
   wherein the temperature during mixing of the premix is maintained at a temperature in a range of x±5° C. (x=150 to 165° C.) for 20 seconds or more.

4. The method for manufacturing a tire member according to claim 1,
   wherein the thiosulfuric acid compound containing an amino group is at least one selected from the group consisting of thiosulfuric acid compounds represented by any one of the following formulae (1) to (3) and their salts:

$$H_2N\text{---}(CH_2)_n\text{---}SSO_3H \quad (1)$$

wherein n is an integer of from 2 to 9;

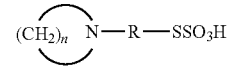
(2)

wherein R represents an alkanediyl group having from 3 to 12 carbon atoms, and n is an integer of from 2 to 5; and

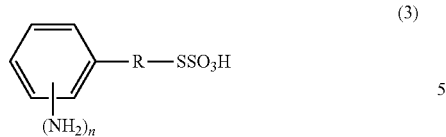 (3)

wherein R represents an alkanediyl group having from 1 to 6 carbon atoms, and n is an integer of from 1 to 2.

5. The method for manufacturing a tire member according to claim 1,
wherein the tire member is a tread member or a sidewall member of a tire.

6. A tire member obtained by the manufacturing method according to claim 1.

7. A tire comprising the tire member according to claim 6.

8. The method for manufacturing a tire member according to claim 1,
wherein the temperature during the mixing of the premix is maintained within 145 to 170° C. for 20 to 120 seconds.

9. The method for manufacturing a tire member according to claim 8,
wherein the temperature during the mixing of the premix is maintained within 145 to 170° C. for 20 to 60 seconds.

* * * * *